United States Patent
Rongve et al.

(10) Patent No.: US 9,520,714 B2
(45) Date of Patent: Dec. 13, 2016

(54) PROTECTING AN OPERATION CONTROL UNIT CONNECTED TO AN ELECTRIC MACHINE VIA A LONG CABLE

(75) Inventors: Knut Rongve, Fyllingsdalen (NO); Tor-Odd Ronhovd, Bergen (NO)

(73) Assignee: ABB AS, Billingstad (NO)

( * ) Notice: Subject to any disclaimer, the term of this patent is extended or adjusted under 35 U.S.C. 154(b) by 96 days.

(21) Appl. No.: 14/002,045

(22) PCT Filed: Mar. 2, 2011

(86) PCT No.: PCT/EP2011/053073
§ 371 (c)(1),
(2), (4) Date: Aug. 28, 2013

(87) PCT Pub. No.: WO2012/116742
PCT Pub. Date: Sep. 7, 2012

(65) Prior Publication Data
US 2013/0335863 A1   Dec. 19, 2013

(51) Int. Cl.
*H02H 9/04* (2006.01)
*H02H 3/20* (2006.01)
*H02H 7/08* (2006.01)

(52) U.S. Cl.
CPC ............. *H02H 9/041* (2013.01); *H02H 3/20* (2013.01); *H02H 7/0833* (2013.01)

(58) Field of Classification Search
CPC ......... H02H 9/041; H02H 7/0833; H02H 3/20
USPC .......................................................... 361/18
See application file for complete search history.

(56) References Cited

U.S. PATENT DOCUMENTS

| | | | |
|---|---|---|---|
| 3,391,326 A * | 7/1968 | Sikes | H02H 3/24 361/90 |
| 4,262,256 A * | 4/1981 | Blais | G05F 1/44 323/223 |
| 4,766,360 A | 8/1988 | Haraguchi et al. | |
| 5,734,256 A | 3/1998 | Larsen et al. | |
| 6,226,162 B1 | 5/2001 | Kladar et al. | |
| 7,164,562 B2 | 1/2007 | Virtanen | |
| 7,227,325 B1 | 6/2007 | Talja et al. | |
| 7,479,756 B2 * | 1/2009 | Kasunich et al. | 318/732 |
| 8,300,378 B2 * | 10/2012 | Birnbach | H01H 83/10 361/117 |
| 8,476,854 B2 * | 7/2013 | Blocher | H02M 7/483 318/400.01 |

FOREIGN PATENT DOCUMENTS

| | | |
|---|---|---|
| RU | 28743 U1 | 4/2003 |
| WO | 2009135730 A1 | 11/2009 |

OTHER PUBLICATIONS

International Preliminary Report on Patentability Application No. PCT/EP2011/053073 Completed: Jun. 13, 2013 16 pages.
(Continued)

*Primary Examiner* — Zeev V Kitov
(74) *Attorney, Agent, or Firm* — Whitmyer IP Group LLC

(57) ABSTRACT

A system for operating an electric machine and a method for protecting an operation control unit in such a system. The system includes an operation control unit, an alternating current cable connecting the machine with the operation control unit and an electric short-circuiting arrangement. This arrangement is connected to terminals of the operation control unit facing the cable and short circuits these terminals based on a detected overvoltage.

20 Claims, 2 Drawing Sheets

(56) References Cited

OTHER PUBLICATIONS

International Search Report and Written Opinion of the International Searching Authority Application No. PCT/EP2011/053073 Completed: Dec. 22, 2011; Mailing Date: Dec. 30, 2011 9 pages.

* cited by examiner

PROTECTING AN OPERATION CONTROL UNIT CONNECTED TO AN ELECTRIC MACHINE VIA A LONG CABLE

FIELD OF INVENTION

The present invention generally relates to the operation of electric machines. More particularly the present invention relates to a system for operating an electric machine and a method for protecting an operation control unit in such a system.

BACKGROUND

When feeding AC power through long cables in transmission systems feeding an electrical load (machines/or other loads), the voltage at the consumer end will be heavily influenced by the electrical load drawn by the consumer.

An example of such a long cable is a cable some kilometers in length connecting a power supply comprising a frequency converter on land to a transformer or to a motor of a pump installed out to sea. In the field of Oil and Gas exploration and production, such loads or machines providing long step-out applications may for example be mounted on the seabed tens of kilometers away from land or away from a topside platform or land installation comprising the frequency converter. Electrical equipment such as a subsea multiphase pump or pressure booster pump or a subsea compressor used in Oil and Gas production or transfer installations may be operated underwater, e.g. on the seabed, at depths 1000 meters, or more.

For electrical consumers like induction motors, the effect of long power cables can generate over voltages caused by self excitation. Self excitation of induction motors can occur if the electrical source is suddenly disconnected during operation, or power flow from supply is obstructed, for instance like stopping the modulation of a frequency converter. This phenomenon occurs in situations where the reactive power production on the cable reaches a higher level than the reactive power consumed by the electric machine. The capacitive contribution from the cable may therefore cause an induction motor to enter self excitation, which situation can lead to harmful over voltages.

Therefore, in these long step-out applications, with long cable lengths, there is a potential risk for over voltage generation due to self excitation.

In order to avoid the connected electrical equipment being harmed it is then important to protect it from these over-voltages.

One known protective circuit comprises the diode bridge. U.S. Pat. No. 7,227,325 does for instance describe a protective circuit with a diode bridge and thyristor as switch used for protecting a frequency converter. The diode bridge is placed close to a motor and here short circuits the connection between the frequency converter and the motor in response to the detection of a fault in the frequency converter.

U.S. Pat. No. 7,164,562 describes a protection configuration provided for short-circuiting a converter in case of network faults. The protection circuit is here connected to the rotor of a generator.

Various other protective circuits are described in U.S. Pat. No. 5,734,256, U.S. Pat. No. 4,766,360, U.S. Pat. No. 6,226,162 and U.S. Pat. No. 7,479,756.

However none of the documents describe the problem of protecting against over-voltages due to self-excitation caused by the combination of long cables and electric machines.

SUMMARY OF THE INVENTION

The present invention is directed towards protecting an operation control unit in a system for operating an electric machine from overvoltages caused by self-excitation.

One object of the present invention is to provide a system for operating an electric machine, which has such overvoltage protection capability.

This object is according to a first aspect of the present invention achieved through a system for operating an electric machine comprising:
an operation control unit,
an alternating current cable connecting the machine with the operation control unit, and
an electric short-circuiting arrangement connected to terminals of the operation control unit facing the cable, said arrangement being configured to short circuit said terminals based on a detected overvoltage.

Another object of the present invention is to provide a method for protecting an operation control unit in such a system.

This object is according to a second aspect of the present invention achieved through a method for protecting an operation control unit in a system for operating an electric machine and comprising:
detecting an overvoltage at terminals of the operation control unit facing an alternating current cable leading to the electric machine, and
short-circuiting the terminals based on the detected overvoltage.

The present invention has a number of advantages. The short-circuiting arrangement is very fast which is advantageous in relation to long step-out systems. The design is also very reliable since the arrangement is an autonomous arrangement. Furthermore, by having the arrangement connected to the output of the operation control unit the voltage and current being fed back to the operation control unit is limited, which limits the stress on components inside it.

BRIEF DESCRIPTION OF THE DRAWINGS

The present invention will in the following be described with reference being made to the accompanying drawings, where FIG. 1 schematically shows an operations control unit for an electric machine being connected to the electric machine via a long AC cable as well as to an AC grid, FIG. 2 schematically shows a land installation being connected to a subsea installation, FIG. 3 schematically shows an electric short-circuiting arrangement being provided in the land installation, and FIG. 4 schematically shows a flow chart including a number of method steps in a method for operating the electric short-circuiting arrangement.

DETAILED DESCRIPTION OF THE INVENTION

In the following, a detailed description of preferred embodiments of the invention will be given.

Figure 1:
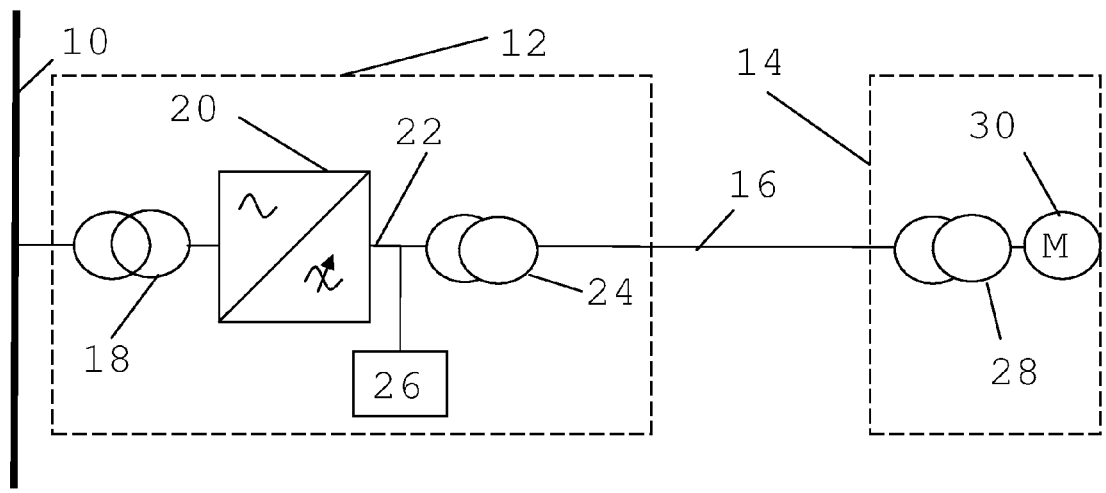

FIG. 1 shows a schematic diagram of the principal electrical components involved in practicing the invention. It shows, from left to right, an AC power network or grid 10 operating as a power supply, a first transformer 18 acting as an input transformer, a variable frequency power converter/inverter or converter 20 and a second transformer 24, which second transformer is a step-up transformer. The converter 20 is here connected to the second transformer 24 via a local AC bus 22 and to this bus there is connected an electric short-circuiting arrangement 26. The AC bus 22 is here typically a three-phase bus and thus comprises at least three conductors. The first transformer 18, the converter 20, the AC bus 22, the second transformer 24 and the electric short-circuiting arrangement 26 are here provided in a land installation 12. This means that they are with advantage provided together in the same location.

The second transformer 24 is connected to a long power supply line or alternating (AC) current cable 16, which cable 16 is as an example operated at a high voltage of 40 kV or more. The long AC cable 16 is further connected to a third transformer 28, in this case a step down transformer, and the third transformer 28 is thereafter connected to an electric machine 30 or an electrical consuming load running in this example in the range 4-6 kV. In this example the machine is furthermore a motor. The third transformer 28 and electric machine 30 are here provided in a subsea installation 14. They are thus also provided together in the same location. The installations are here indicated through dashed boxes.

The converter 20, transformers 18, 24, 28, cable 16 and electric short-circuiting arrangement 26 together make up a system for operating the electric machine. Sometimes the machine 30 is also considered to be a part of this system.

The functioning of the system in FIG. 1 is the following. Power is supplied from the grid 10 to a power converter/inverter 20 via the first transformer 18. The converter/inverter 20 in turn provides AC power that is stepped up in the second transformer 24 at the converter end, applied at high voltage over the long line 16, stepped down in the third transformer 28 at the machine end, and supplied to the machine 30. The converter/inverter 20 may also be described as a variable speed drive. It is furthermore in fact an operation control unit because it is used for controlling the operation of the electric machine.

Figure 2:
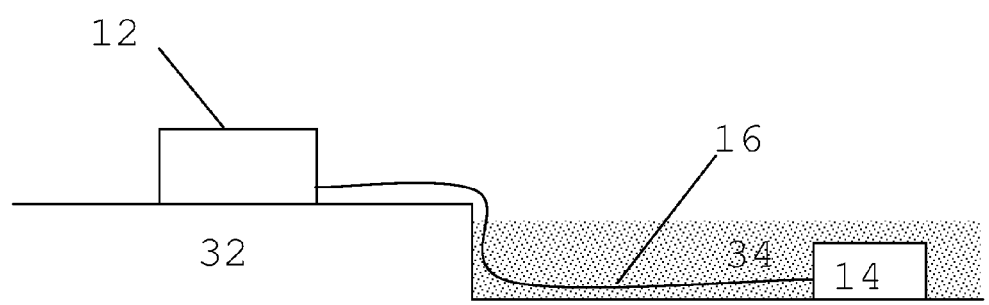

FIG. 2 shows a simple sketch of the land installation 12 provided on land 32 connected to a first end of the AC cable 16, where a second end of the cable 16 is connected to the machine many kilometers out to sea. In this example the sea installation 14, where the electric machine or load is provided, is placed on the seabed, but the sea installation could equally as well or instead be installed underwater in some other way, or installed on a fixed or floating platform or ship of some kind.

Figure 3:
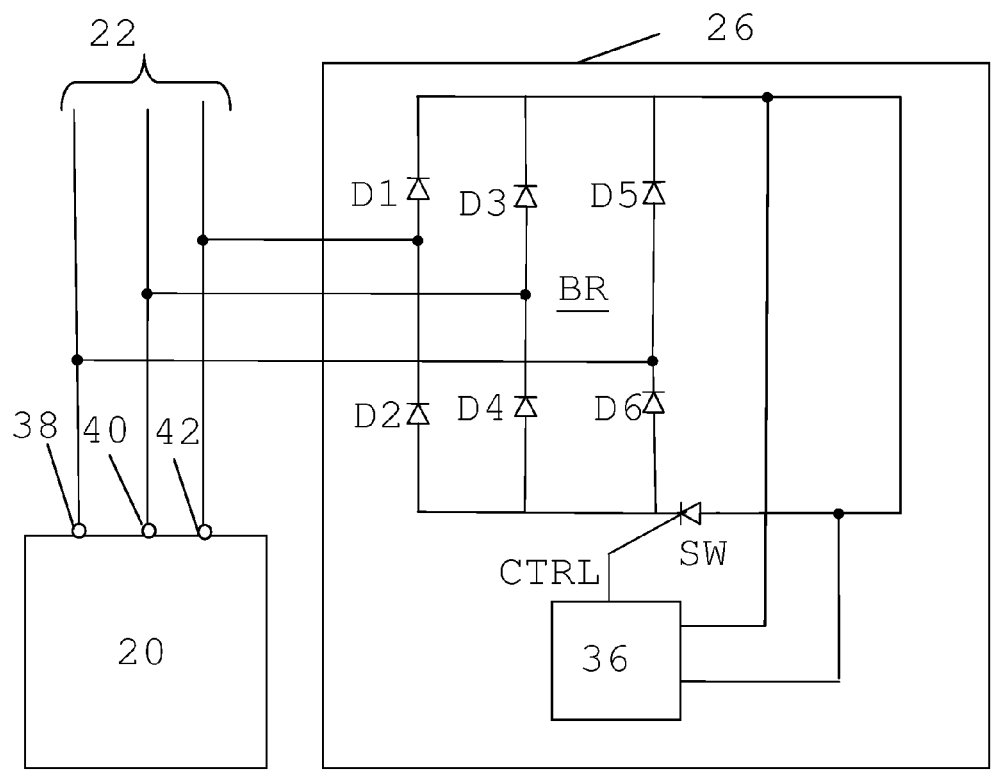

FIG. 3 schematically shows the electric short-circuiting arrangement 26 according to a first embodiment of the invention. In this variation of the invention it is made up of a diode bridge BR having a number of parallel bridge legs. There are in this case three bridge legs, one for each phase of the AC bus 22. There is here a first leg comprising a first and a second diode D1 and D2, a second leg comprising a third and a fourth diode D3 and D4 and a third leg comprising a fifth and a sixth diode D5 and D6, where the diodes of the phase legs all have the same orientation. The midpoint of each bridge leg is connected to a corresponding phase conductor of the AC bus 22. The two ends of each leg are furthermore interconnected via a switch SW that is opened or closed based on a control signal CTRL. In this example the switch is a thyristor with a gate for being controlled. It can therefore be seen that this switch SW is closed based on a voltage on the gate. It can also be seen that the switch SW is connected for short-circuiting the diode bridge. In the first embodiment of the invention the control signal CTRL is generated by a short-circuiting control unit 36. The electric short-circuiting arrangement 26 thus includes a short-circuiting control unit 36 for actuating the switch. Furthermore in this first embodiment the control signal CTRL is generated based on the voltage of the AC bus 22, which voltage in turn influences a DC voltage of the diode bridge. The diode bridge provides this DC voltage across the legs. Therefore the short-circuiting control unit 36 has two input terminals connected to the two ends of the bride legs, one connected to one side of the bridge legs and the other connected to the opposite side. The short-circuiting control unit 36 also has a control signal output, which provides the control signal CTRL that actuates the switch SW and which control signal output is therefore connected to the gate of the thyristor. The control signal CTRL is provided based on the detected DC voltage across the diode bridge legs. The diode bridge legs can then be short circuited through closing the electronic switch SW, which will short-circuit the phase conductors of the AC bus 22. There are no moving mechanical parts.

In the figure it can furthermore be seen that the conductors of the AC bus 22 are connected to corresponding connection terminals 38, 40 and 42 of the converter 20. These converter terminals are therefore AC terminals facing the AC cable 16.

For long step-out applications with long cable lengths, there is a potential risk for overvoltage generation due to self excitation. This phenomenon occurs in situations where the reactive power production on the cable reaches a higher level than the consumed reactive power of the machine. This means that if a capacitive current running from between the converter and the electric machine is higher than an inductive current in the electric machine, self-excitation will be caused. The inductance of the electric machine is typically correlated to the size of the electric machine, which means that the smaller the machine is the higher the risk of self-excitation. Likewise the capacitance on the drive side has a strong dependence on the capacitance of the cable. This capacitance is in turn dependent on the length of the cable. This also means that the longer the cable is the higher the risk is of self excitation.

For electrical consumers like induction motors, the effect of long power cables can thus lead to overvoltages caused by self excitation. The above-described relationship between capacitive cable current and inductive machine current can occur if the electrical source is suddenly disconnected during operation, or power flow from supply is obstructed, such as stopping the modulation of the frequency converter.

Under the assumption that the capacitive contributions from other elements than the cable are negligible to the capacitive current the following expression can be set up $$C = k*l*n^2 \quad (1)$$

where C is the cable capacitance, n is the transformer turns ratio, k is a cable constant and l is the length.

Furthermore since the capacitive cable current should be equal to or higher than the inductive machine current for self-excitation to occur, the following expression can be set out using Ohms law:

$$\omega C \geq 1/(\omega*L) \quad (2)$$

where L is the inductance of the electric machine as seen by the cable (i.e. considering transformation being made by the third transformer).

Substituting equation (1) into equation (2) provides the following result $$l \geq 1/(\omega^2 * n^2 * L * k) \qquad (3)$$

As can be seen in equation (3) self-excitation can occur if the cable length l is longer than what is set out above.

The cable may as an example be more than ten kilometers long.

In order to react to self-excitation it is necessary to disconnect the converter from the electric machine. This disconnection needs furthermore be fast in order to protect electronic components in equipment like the converter.

The conventional way of providing such disconnection is through using a circuit breaker with a relay. However, this is normally too slow in these situations. A typical circuit breaker will break a connection within 70 milliseconds or more, which may be too long.

However, the electric short-circuiting arrangement according to the invention, which in this first embodiment is based on a diode bridge, often denoted crowbar, enables a fast breaking.

Figure 4:
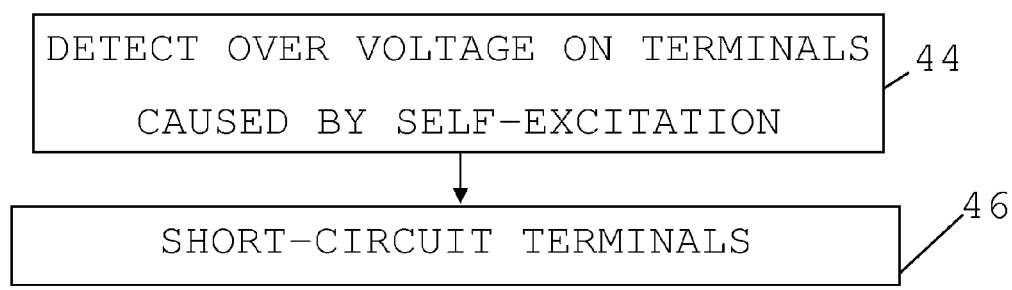

How an overvoltage caused by self-excitation can be handled according to a method of the invention will now be described with reference being made also to FIG. 4, which shows a flow chart of a method of short-circuiting the AC bus 22.

The short-circuiting control unit 36 of the electric short-circuiting arrangement 26 continuously monitors the DC voltage across the bridge legs of the diode bridge or crowbar. This DC voltage corresponds to the peak AC voltage and thereby to the voltage on the cable. If the short-circuiting control unit 36 detects that there is an overvoltage on the AC bus 22 and thereby an overvoltage at the connection terminals 38, 40, 42 of the converter 20, where the overvoltage is caused by self-excitation, step 44, the short-circuiting control unit 36 then controls the crowbar to short circuit the AC bus and thereby to short-circuit the connection terminals 38, 40 and 42 based on the detected overvoltage, step 46.

The detection may here be performed through comparing the DC voltage across the bridge legs with an appropriately set threshold and if the threshold is exceeded, then the short-circuiting control unit 36 determines that there is self-excitation in the system and the converter 20 has to be protected. The short-circuiting is here done through closing the switch SW, which is here done through turning on the thyristor, which effectively short-circuits the individual conductors of the AC bus 22. As the conductors are connected to the AC terminals 38, 40 and 42 of the converter 20 it can therefore also be seen that the electric short-circuiting arrangement short-circuits these terminals based on a detected overvoltage. It can more particularly be seen that the short-circuiting control unit 36 is configured to close the switch SW based on the voltage at these terminals since the measured DC voltage is the rectified AC voltage.

When the crowbar is activated, it will limit overvoltages within micro seconds, and therefore this circuit is more suited for over voltage protection than slow conventional circuit breakers.

The crowbar is ideal to prevent overvoltage to occur in a power system. As shown in the first embodiment of the electric short-circuiting arrangement, the crowbar may be designed as a fully autonomous unit that short circuits the phases of the AC voltage if a threshold voltage is reached. Here it is possible to provide the short-circuiting control unit through the use of one or more break over diodes (BOD) connected between the anode and the gate of the thyristor. A break over diode will then be set to start to conduct when the DC voltage, which is also the voltage across the thyristor, exceeds the threshold value and thereby triggering the thyristor. The crowbar can in this way be self-triggering based on break over diodes (BOD). It does thus not require a control system, but is autonomous. By applying a crowbar for such applications the quick reaction time will limit the overvoltage to a minimum. As a consequence, the crowbar will prevent failure of electrical components connected to the induction motor, such as components in the converter.

The short-circuiting control unit 36 may as an alternative be provided through a voltage dividing arrangement, like a resistive voltage dividing arrangement, connected to a comparator, where the voltage dividing arrangement divides the DC voltage to a suitable level for comparing with a threshold level in the comparator, and where the comparator provides the control signal CTRL so that the crowbar is self-triggered if the DC voltage reaches a certain level.

It is also possible with external triggering of the crowbar. This may be employed as a back-up protection function for the converter. The converter may be equipped with a protection function of it's own that may perform a protective measure. The crowbar may according to this variation perform short-circuiting of the AC voltage in case this ordinary protection function fails to deliver. In this case it is possible that the converter provides a protection activation signals to the electric short-circuiting arrangement when the converter is about to perform an activity. The short-circuiting control unit of the electric short-circuiting arrangement may then perform short-circuiting if it notices that the converter fails to actually perform this activity. In order to do this it is possible that the short-circuiting control unit includes a further terminal receiving the protection activation signal. This may in turn be connected to an AND circuit via a delay unit. The AND circuit would then also receive a scaled down version of the DC voltage. Then the AND circuit will provide a control signal closing the switch if a DC voltage is present across the bridge legs at the same time as a delayed protection activation signal is present, thereby activating the crowbar. In this latter situation the crowbar thus serves as back-up over protection or a secondary over voltage protection for the frequency converter.

The invention has a number of advantages. The short-circuiting arrangement is very fast which is advantageous in relation to long step-out systems. The design is also very reliable since the arrangement is autonomous. Furthermore, by having the arrangement connected to the output of the converter the voltage and current being fed back to the converter is limited, which limits the stress on DC link components inside the converter.

It should be noted that the above described exemplifying embodiment of the invention can be varied in a number of ways. The use of step-up and step-down transformers are for instance associated with transmission over very long distances. If this is not necessary while the electric machine is small, it is possible to omit the step up and step down transformers. It is furthermore possible that the converter is already operating at the AC voltage level of the AC grid, which means that in some cases the first transformer may also be omitted. The operating control unit or drive unit for the electric machine was above described as a frequency converter. However, it should be realized that other types of units cane be used instead, such as an inverter connected to DC system instead of to the AC grid. The electric machine may furthermore be a generator instead of a motor.

In the electric short-circuiting arrangement, the switch was a thyristor. It should be realized that the switch can be another type of semiconductor device, such as an IGBT, IGCT or a triac. The rectifying bridge may also be made up of other elements than diodes. Furthermore it is possible to measure the AC voltage of the AC bus directly and compare with a threshold instead of measuring the DC voltage across the bridge legs of the diode bridge.

From the foregoing discussion it is evident that the present invention can be varied in a multitude of ways. It shall consequently be realized that the present invention is only to be limited by the following claims.

The invention claimed is:

1. A system for operating an electric machine comprising:
an operation control unit controlling operation of the machine,
an alternating current cable connecting the machine with the operation control unit, which alternating current cable is more than 10 kilometers long, and
an electric short-circuiting arrangement adapted to protect the operation control unit, said arrangement connected to terminals of the operation control unit facing the cable, said arrangement being configured to short circuit said terminals based on an overvoltage detected at said terminals.

2. The system according to claim 1, wherein the short-circuiting arrangement comprises a diode bridge connected to said terminals of the operation control unit.

3. The system according to claim 2, wherein the short-circuit arrangement comprises a switch connected for short-circuiting the diode bridge and a short-circuiting control unit for actuating the switch.

4. The system according to claim 3, wherein the switch has a gate and is configured to be closed based on a voltage on the gate.

5. The system according to claim 4, wherein the switch is a thyristor.

6. The system according to claim 3, wherein the short-circuiting control unit is configured to close the switch based on the voltage at said terminals.

7. The system according to claim 3, wherein the short-circuiting control unit is configured to close the switch based on the failure of a protective activity of the operation control unit.

8. The system according to claim 1, further comprising a step up transformer between the operations control unit and the cable and a step down transformer between the cable and the electric machine.

9. The system according to claim 1, wherein the operations control unit is a frequency converter.

10. The system according to claim 1, wherein the cable is a subsea cable and the electric machine is a subsea electric machine.

11. The system according to claim 1, wherein the electric machine is a motor.

12. The system according to claim 1, further comprising the electric machine.

13. A method for protecting an operation control unit in a system for operating an electric machine,
the system having
an alternating current cable connecting the machine with the operation control unit, which alternating current cable is more than 10 kilometers long, and
an electric short-circuiting arrangement connected to terminals of the operation control unit facing the cable, said arrangement being configured to short circuit said terminals based on an overvoltage,
the method comprising the steps of:
detecting an overvoltage at the terminals of the operation control unit facing the alternating current cable leading to the electric machine, and
short-circuiting the terminals based on the detected overvoltage.

14. A system for operating an electric machine comprising:
an operation control unit controlling operation of the machine,
an alternating current cable connecting the machine with the operation control unit, and
an electric short-circuiting arrangement,
wherein the short-circuiting arrangement comprises a diode bridge connected to terminals of the operation control unit,
wherein the short-circuit arrangement comprises a switch which is a thyristor connected for short-circuiting the diode bridge and a short-circuiting control unit for actuating the switch,
wherein the switch has a gate and is configured to be closed based on a voltage on the gate,
wherein the short-circuiting control unit has two input terminals connected to two ends of the bridge legs, one connected to one side of the bridge legs and the other connected to an opposite side,
wherein the short-circuiting control unit has a control signal output, which provides the control signal that actuates the switch based on the detected DC voltage across the diode bridge legs and which control signal output is connected to the gate of the thyristor,
wherein the alternating current cable is more than 10 kilometers long, and wherein said arrangement is connected to terminals of the operation control unit facing the cable and configured to short circuit said terminals based on an overvoltage detected at said terminals.

15. The system according to claim 1, wherein the electric short-circuiting arrangement is autonomous such that it does not require a control system but is instead self-triggering.

16. The method according to claim 13, wherein the electric short-circuiting arrangement is autonomous such that it does not require a control system but is instead self-triggering.

17. The method according to claim 13, wherein the short-circuiting arrangement comprises a diode bridge connected to said terminals of the operation control unit.

18. The method according to claim 13, further comprising a step up transformer between the operations control unit and the cable and a step down transformer between the cable and the electric machine.

19. The method according to claim 13, wherein the operations control unit is a frequency converter.

20. The system according to claim 1, further comprising a step up transformer between the operations control unit and the cable and a step down transformer between the cable and the electric machine,
wherein the short-circuiting arrangement comprises a diode bridge connected to said terminals of the operation control unit, and
wherein the operations control unit is a frequency converter.

* * * * *